(12) United States Patent
Bellis et al.

(10) Patent No.: US 9,297,707 B2
(45) Date of Patent: Mar. 29, 2016

(54) APPARATUS FOR FLUID TEMPERATURE MEASUREMENT

(71) Applicant: ROLLS-ROYCE CONTROLS AND DATA SERVICES LIMITED, Derby, Derbyshire (GB)

(72) Inventors: Mark Bellis, Derby (GB); Paul Thornton, Derby (GB)

(73) Assignee: ROLLS-ROYCE CONTROLS AND DATA SERVICES LIMITED, Derby (GB)

( * ) Notice: Subject to any disclaimer, the term of this patent is extended or adjusted under 35 U.S.C. 154(b) by 470 days.

(21) Appl. No.: 13/852,314

(22) Filed: Mar. 28, 2013

(65) Prior Publication Data

US 2013/0259088 A1   Oct. 3, 2013

(30) Foreign Application Priority Data

Apr. 3, 2012   (GB) .................................. 1205971.3

(51) Int. Cl.
| | |
|---|---|
| G01K 3/06 | (2006.01) |
| G01K 3/14 | (2006.01) |
| G01K 13/02 | (2006.01) |
| G01K 1/02 | (2006.01) |

(52) U.S. Cl.
CPC .............. G01K 13/02 (2013.01); G01K 1/026 (2013.01); *G01K 2013/024* (2013.01); *G01K 2213/00* (2013.01)

(58) Field of Classification Search
CPC ............. G01K 3/00; G01K 3/06; G01K 3/14; G01K 3/08; G01K 5/28; G01K 13/04; G01K 13/00
See application file for complete search history.

(56) References Cited

U.S. PATENT DOCUMENTS

| | | | | | |
|---|---|---|---|---|---|
| 3,618,386 | A | * | 11/1971 | Black | G01K 11/22 374/115 |
| 3,829,849 | A | * | 8/1974 | Stauffer | G01K 7/026 340/595 |
| 4,186,605 | A | * | 2/1980 | Bourigault | G01K 3/06 374/115 |
| 4,901,061 | A | * | 2/1990 | Twerdochlib | G01K 3/14 340/501 |
| 5,074,672 | A | * | 12/1991 | Emery | G01K 1/143 277/616 |
| 5,106,203 | A | * | 4/1992 | Napoli | F01D 17/085 374/144 |
| 5,663,899 | A | * | 9/1997 | Zvonar | G01K 15/00 236/15 BB |
| 7,140,186 | B2 | | 11/2006 | Venkateswaran et al. | |
| 7,481,100 | B2 | * | 1/2009 | Ponziani | G01M 15/14 73/112.01 |
| 7,703,976 | B2 | | 4/2010 | Henshaw et al. | |
| 2002/0150142 | A1 | | 10/2002 | Sanderson | |
| 2006/0178857 | A1 | * | 8/2006 | Barajas | G01K 7/42 702/189 |
| 2007/0211784 | A1 | * | 9/2007 | Simunovic | G01K 1/022 374/141 |
| 2008/0291964 | A1 | | 11/2008 | Shrimpling et al. | |
| 2008/0295604 | A1 | * | 12/2008 | Hoyte | G01M 15/14 73/760 |
| 2009/0312930 | A1 | * | 12/2009 | Nakakita | F01D 17/08 701/100 |
| 2010/0219818 | A1 | | 9/2010 | Fischer et al. | |
| 2012/0044969 | A1 | | 2/2012 | Zebrowski | |
| 2015/0068209 | A1 | * | 3/2015 | Agrawal | G01M 15/14 60/726 |

FOREIGN PATENT DOCUMENTS

JP           56133636 A   *   10/1981

* cited by examiner

*Primary Examiner* — Gail Kaplan Verbitsky
(74) *Attorney, Agent, or Firm* — Oliff PLC

(57) ABSTRACT

An apparatus for measuring the circumferential distribution of temperature in a fluid, comprising a plurality of sensor ladders, each incorporating a plurality of temperature sensors, wherein a first one of the sensor ladders partially overlaps a second one of the sensor ladders, part of the first sensor ladder not overlapping the second sensor ladder.

19 Claims, 6 Drawing Sheets

APPARATUS FOR FLUID TEMPERATURE MEASUREMENT

This invention relates to an apparatus for measuring fluid temperature, for example for use in the measurement of turbine gas temperature in a gas turbine engine.

In some applications it is useful to monitor the temperature of a fluid flowing along a passage. Unexpected variations in the temperature measurements may be used to provide an indication that a fault condition has arisen in equipment located upstream of the temperature sensors used to derive the measurements. Where the passage is of annular form or is of relatively large dimensions, the gas temperature profile across the passage may not be uniform, and so it may be desirable to provide a number of sensors at different locations in order to derive the temperature profile. Depending upon the nature of the passage and the equipment located upstream of the sensors, the derivation of such a profile may permit the determination of additional information about a fault condition that may have arisen, for example providing information about the location of the fault.

One example of such a system is in a gas turbine engine, in which it is known to monitor the distribution of turbine gas temperature, for instance to monitor the functioning of the upstream combustion system and to detect the occurrence of fault conditions therein.

U.S. Pat. No. 7,703,976 discloses a measurement apparatus in which multiple sensors are connected in parallel to form sensor ladders. The output of each sensor ladder corresponds with the average sensor output.

In order to detect fuel system faults, a turbine gas temperature monitoring system may need to be capable of detecting variations in the combustor exit temperature profile. Such traverse anomalies may be associated with performance degradation or failure of parts of the fuel distribution system. It is further desirable that this be achieved using the minimum of components and harnessing.

Fuel system component faults may be hazardous. For example, increased flow to a single burner may result in an engine hot spot. It is important, therefore, that such faults are rapidly and reliably sensed. As a temperature sensor fault, or a fault in the associated harness or in the control unit to which the temperature information is supplied, could prevent such a fault being sensed, there may be occasions where an aircraft is not permitted to fly due to the presence of a sensor fault or the like, rather than due to a fault with the associated fuel system. It is therefore desirable that a turbine gas temperature monitoring system is capable of tolerating single point failures within the monitoring system without compromising the ability of the monitoring system to sense the presence of a fault in the associated fuel system.

A known arrangement for turbine gas temperature monitoring, shown diagrammatically in FIG. 1, is to use two sensor ladder harnesses 101, 102, each of which in this case is of substantially semi-circular form, with the output of each harness corresponding to the average temperature over a respective half of the engine. The sensor ladders 101 and 102 are connected to respective channels of the associated electronic engine controller (not shown). A failure of one of the sensors, harnesses or in one of the channels of the controller would impact upon the ability of the system to sense a fault and so, in some circumstances, may lead to the associated aircraft not being permitted to fly.

To provide redundancy, dual temperature probes have been used. For example, as shown in FIG. 2, a dual temperature probe may be provided at each circumferential sensor location (identified in FIG. 2 as locations 1 to 12), each probe having an inner temperature sensor and an outer temperature sensor which are radially offset from one another. The inner temperature sensors are connected, as in the arrangement of FIG. 1, to form two separate inner semi-circular sensor ladders 201, 202. Similarly, the outer temperature sensors are connected to form two outer semi-circular sensor ladders 203, 204. The first channel A of the controller is connected to the two outer sensor ladders 203, 204, and the second channel B thereof is connected to the two inner sensor ladders 201, 202. Such an arrangement provides the required level of redundancy as a failure within a single sensor, harness or channel will not prevent the sensing of temperature at any one of the locations 1 to 12. Consequently, the aircraft may still be permitted to fly.

For larger engines, in order to accurately sense faults, a higher degree of resolution may be required. By way of example, FIG. 3 illustrates an arrangement in which four sensor ladders 301, 302, 303, 304 are provided. Each of the sensor ladders extends over a quadrant of the gas path, compared to the arrangements of FIGS. 1 and 2 in which each ladder extends over half of the path. In this arrangement a single temperature probe is provided at each circumferential location 1 to 12. The four sensor ladders 301, 302, 303, 304 thus comprise, respectively, the sensors at circumferential locations 1-3, 4-6, 7-9 and 10-12. Each sensor ladder 301, 302, 303, 304 is connected to both channels A and B of the controller.

Whilst such an arrangement may provide the required level of resolution, an individual sensor or harness failure may prevent permission being granted to allow the aircraft to fly, as neither channel would have access to temperature information relating to a sector of the engine (ie a single burner) associated with the faulty sensor/harness, whilst temperature information from the associated quadrant of the gas path would be erroneous, and in this regard the system is similar to that of FIG. 1. Furthermore, the arrangement of FIG. 3 leaves the potential for common mode failure as each ladder is connected to both channels of the controller. A failure in one channel could therefore potentially introduce a fault into the other channel via the common sensor ladder. Also, an environmental event such as a lightning strike affecting one ladder could cause damage to both channels.

Taking into account the vulnerability of such an arrangement to single point and common mode failures, and the likely failure rate of each component of the system, the potential disruption costs may be unacceptable.

Modification of the system, for example in a manner similar to that of FIG. 2, may be used to provide the required level of redundancy. However, to introduce these changes to an arrangement in which the required level of resolution is such that the sensor ladders extend over a quadrant of the fluid path would necessitate a very significant increase in the number of wiring harnesses, leading to significant increases in weight and complexity. Consequently, this is not desired.

There is therefore a need for an apparatus which can measure the circumferential distribution of temperature in a fluid, for example to detect anomalies in gas turbine temperature, which is tolerant to single point faults and which minimises the potential for common mode failures. It is an object of the invention to provide such an arrangement.

According to the invention there is provided an apparatus for measuring the circumferential distribution of temperature in a fluid, comprising a plurality of sensor ladders, each incorporating a plurality of temperature sensors, wherein a first one of the sensor ladders partially overlaps a second one of the sensor ladders, part of the first sensor ladder not overlapping the second sensor ladder.

In one arrangement, the apparatus may comprise a plurality of sensor locations, the first sensor ladder incorporating a first plurality of the temperature sensors, each of which is located at a respective one of the sensor locations, and the second sensor ladder incorporating a second plurality of the temperature sensors, each of which is located at a respective one of the sensor locations, wherein at least one of the first plurality of sensors is located at the same sensor location as at least one of the second plurality of sensors, and at least another one of the first plurality of sensors is located at one of the sensors locations not also accommodating one of the second plurality of sensors.

The use of such an arrangement allows an enhancement in resolution to be achieved whilst maintaining a required level of redundancy, and without significantly increasing the number of harnesses required. For example, an arrangement with four harnesses, each harness connected to just one of the channels of an associated controller may be used to provide quadrant-level resolution whilst maintaining single point failure redundancy.

Preferably, the apparatus further comprises a third sensor ladder incorporating a third plurality of temperature sensors, each of which is located at a respective one of the sensor locations, and wherein at least one of the first plurality of sensors is located at the same sensor location as at least one of the third plurality of sensors, and at least another one of the first plurality of sensors is located at one of the sensors locations not also accommodating one of the third plurality of sensors.

Conveniently, none of the third plurality of sensors shares a sensor location with any of the second plurality of sensors.

It will be appreciated that in such an apparatus, each sensor ladder partially overlaps the adjacent two sensor ladders.

The apparatus conveniently further comprises a dual channel controller, the first ladder being connected to the first channel of the controller and the second ladder being connected to the second channel of the controller. Preferably, only one of the sensors located at each sensor location is connected to the first channel, and only a second one of the sensors located at each sensor location is connected to the second channel. Consequently, as there are no sensors common to both channels, the risk of propagation of a fault from one channel to the other via a common sensor is avoided. Further, the risk of a lightning strike or other environmental event causing damage to both channels is reduced.

Each of the sensor ladders is preferably of substantially the same circumferential extent.

Temperature sensors associated with at least two sensor ladders are conveniently located at each sensor location. For example, two temperature sensors may be located at each sensor location. The two temperature sensors may comprise an inner sensor and an outer sensor. At least one of the sensor ladders may incorporate only inner sensors, and another of the sensor ladders may incorporate only outer sensors. Alternatively, each sensor ladder may incorporate at least one inner sensor and at least one outer sensor. For example, the inner and outer sensors may be arranged in an alternating fashion along the sensor ladder, or a central part of the sensor ladder may incorporate only inner sensors with the end parts of the sensor ladder incorporating only outer sensors, or a central part of the sensor ladder may incorporate only outer sensors and the end parts of the sensor ladder may incorporate only inner sensors.

According to another aspect of the invention there is provided a method for identifying the location of an anomaly using an apparatus of the type described hereinbefore, the method comprising the steps of:

comparing the output of one sensor ladder with the outputs of other sensor ladders with which the said one sensor ladder does not overlap to identify the ladder with which the anomaly is associated, and comparing the outputs of the sensor ladders with which the said one sensor ladder partially overlap to identify the sensor location with which the anomaly is associated.

The method may be used to identify the location of an anomaly in an exhaust gas temperature of a gas turbine engine. Indeed, according to another aspect of the invention there is provided a gas turbine engine equipped with an apparatus of the type described hereinbefore. For example, the apparatus may be arranged to measure the circumferential distribution of the exhaust gas temperature in the combustor of the engine, the turbine section of the engine, or in the exhaust nozzle of the engine.

The invention will further be described, by way of example, with reference to the accompanying drawings, in which.

Figure 1:
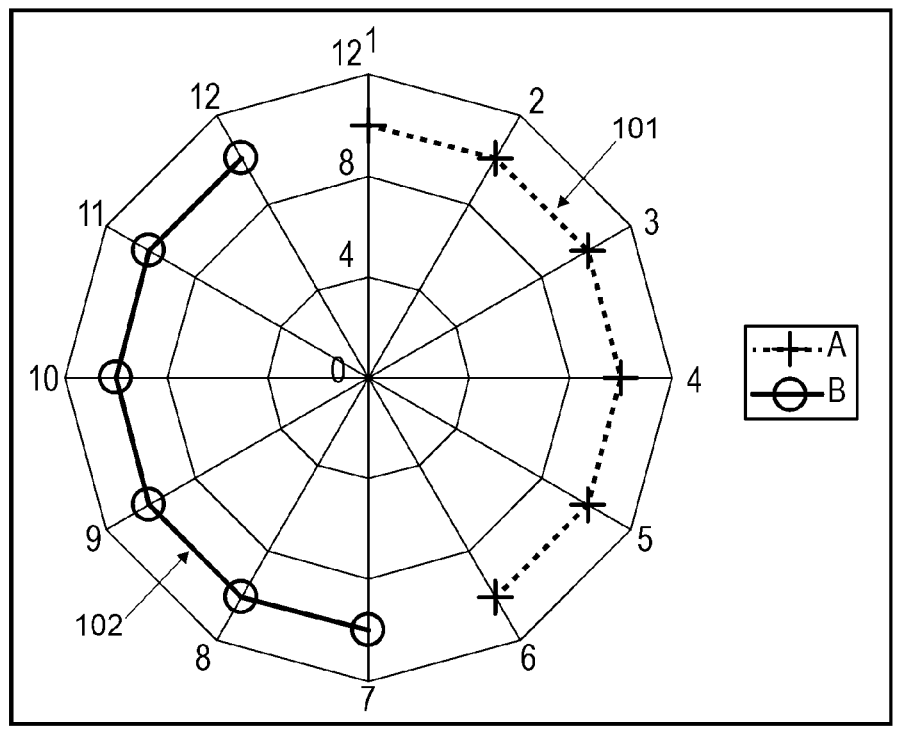
FIG. 1 is a schematic diagram illustrating a known sensor arrangement with two semi-circular sensor ladders.
Figure 2:
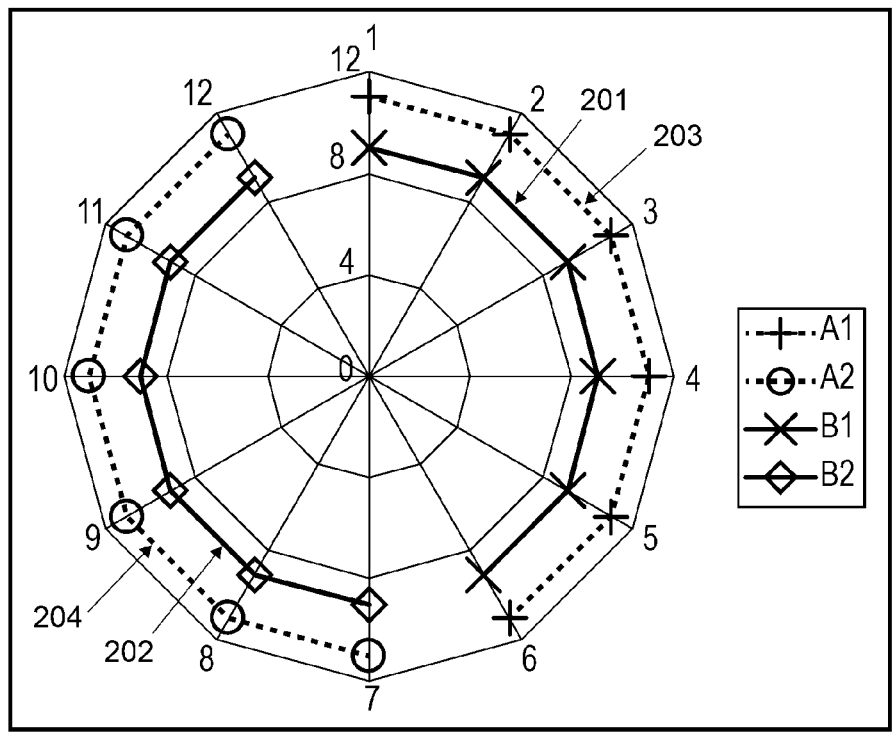
FIG. 2 is a schematic diagram illustrating another known sensor arrangement with two dual redundant semi-circular sensor ladders.
Figure 3:
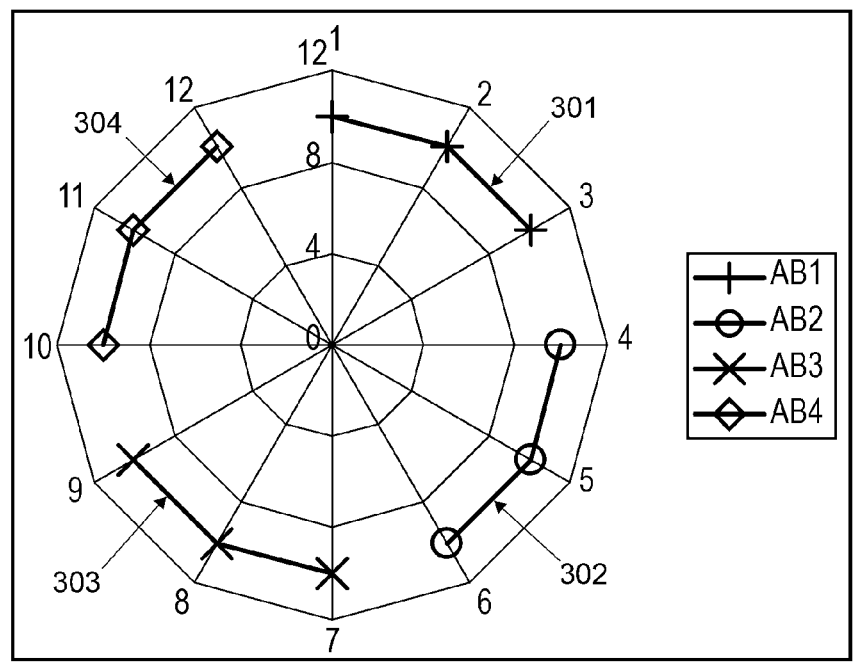
FIG. 3 is a schematic diagram illustrating a quadrant sensor ladder arrangement.

The arrangements of FIGS. 1 to 3, and the disadvantages associated therewith are described hereinbefore.

Figure 4:
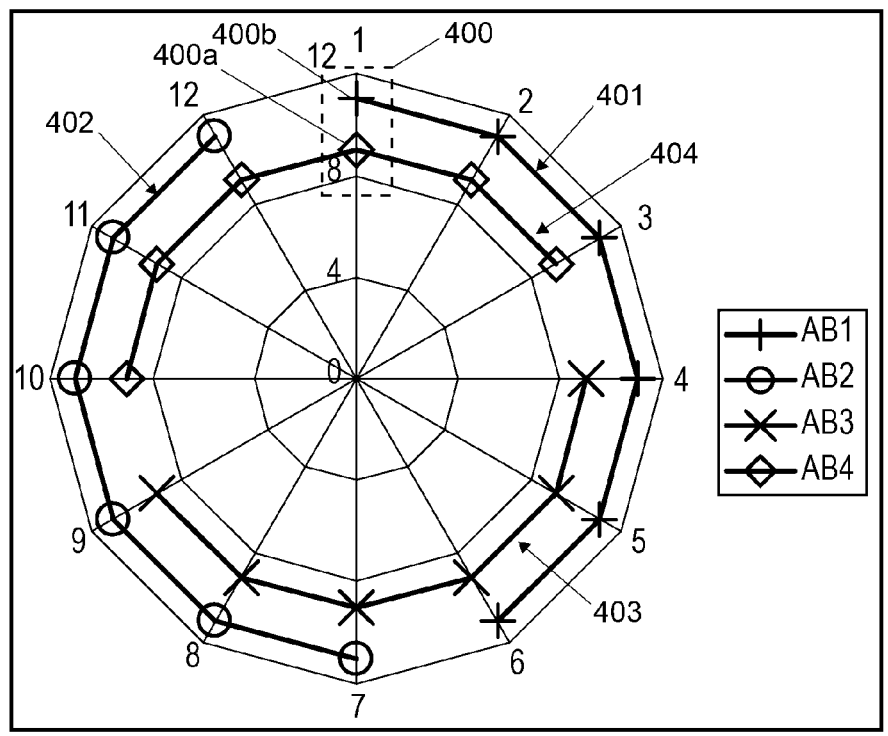
FIG. 4 is a schematic diagram illustrating an embodiment of the invention with four overlapping semi-circular sensor ladders.

Referring next to FIG. 4, an embodiment of the invention is illustrated, diagrammatically, in which twelve dual temperature sensor probes 400 are disposed at equally spaced circumferential sensor locations 1 to 12 within an annular housing 410 of a gas turbine engine and through which turbine gases flow, in use, to provide turbine gas temperature monitoring and thereby permit monitoring of whether or not parts of the engine fuel system upstream of the probes 400 are operating correctly. Each temperature probe 400 comprises an inner temperature sensor 400a and an outer temperature sensor 400b. Two semi-circular outer sensor ladders 401, 402 interconnect or incorporate the outer temperature sensors 400b at sensor locations 1 to 6 and locations 7 to 12, respectively, and two inner semi-circular sensor ladders 403, 404 interconnect or incorporate the inner temperature sensors 400a at sensor locations 4 to 9 and 10 to 3 respectively. As shown, each of the outer ladders 401, 402 is connected to a first channel A of an associated electronic engine controller, and each of the inner ladders 403, 404 is connected to a second channel B of the controller. Arrangements are also possible in which all four ladders are connected to both channels, however such cross-wiring can result in fault propagation from one channel to the other and as such has a detrimental effect on channel segregation.

The arrangement of the ladders 401, 402, 403, 404 is such that each ladder partially overlaps an adjacent one of the ladders. In other words, a first one of the ladders shares some sensor locations with a second one of the ladders, but there are some of the sensor locations associated with the first ladder in which no sensor associated with the second ladder is present. The sensor locations associated with the first ladder and with which no sensors of the second ladder are associated may all be associated with sensors of a third ladder. Thus, for example, taking ladder 401 as the first ladder, ladder 403 as the second ladder and ladder 404 as the third ladder, it will be appreciated that sensor locations 4 to 6 are common to both the first and second ladders 401, 403, and that locations 1 to 3 are associated with the first ladder 401 but not the second ladder 403. Rather, locations 1 to 3 are common to both the first and third ladders 401, 404. There are no locations common to the second and third ladders 403, 404. A similar relationship exists between the ladder 402 and the second and third ladders 403, 404.

In this arrangement, each of the outer sensor ladders 401, 402 partially overlaps two of the inner sensor ladders 403, 404. A combination of the readings from sensor ladders 401 to 404 allow temperature anomalies to be localised to a specific quadrant of the annulus. Each quadrant of the annulus has a different combination of sensor ladders overlapping, which may be used to identify the quadrant in which a temperature anomaly is located. For example, a hot-spot in any of circumferential locations 1 to 3 will result in anomalous readings from sensor ladders 401 and 404.

In the event of a failure of a single temperature sensor 400a, 400b or sensor ladder 401, 402, 403, 404, a degraded operating condition will arise in which temperature anomalies at any of the sensor locations can still be detected. For example, if sensor ladder 401 fails, the remaining sensor ladders 402 to 404 are still able to detect and locate temperature anomalies at any of the circumferential locations 1 to 12. In this example degraded condition a unique combination of sensor ladders 402 to 404 is still affected by a hot-spot in each quadrant, and so comparison of the outputs of these ladders will provide an indication of the location of such a hot-spot.

Furthermore, as the output from each sensor ladder should approximate to the mean of the outputs of the two sensor ladders with which it shares sensor locations, testing of each sensor ladder for the presence of dormant faults may be achieved. For example, the output of sensor ladder 401 should approximate to the means of the outputs of sensor ladders 403 and 404. At engine conditions where the circumferential temperature distribution is known, a diagnostic check of sensor ladder 401 may comprise: applying suitable corrections to the outputs of sensor ladders 403 and 404 based on the known operating conditions, averaging the corrected output of sensor ladders 403 and 404, comparing the output of sensor ladder 401 with the averaged corrected output of sensor ladders 403 and 404. The combined result of applying this process to each of sensor ladders 401 to 404 in turn permits the identification of the presence a faulty sensor ladder with some confidence.

As set out hereinbefore, this arrangement is advantageous in that is permits an enhancement in sensing resolution and redundancy without requiring the use of an increased number of wiring harnesses, and so avoids the cost, complexity and weight associated with the use of a greater number of harnesses. Safety and reliability are also enhanced by reducing the risk of a lightning strike event affecting both channels of the controller, and by avoiding the risk of a fault propagating from one channel of the controller to the other via a common or shared sensor.

Figure 5:
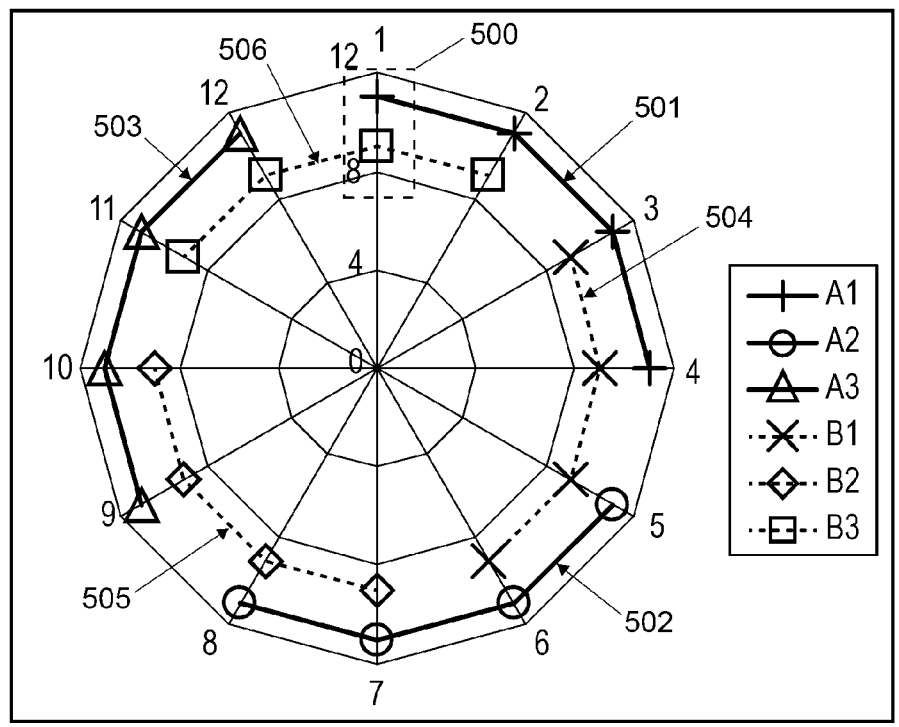
FIG. 5 is a schematic diagram illustrating an alternative embodiment of the invention with six overlapping sensor ladders.

Referring next to FIG. 5, an alternative embodiment of the invention is illustrated in which six harnesses or ladders 501 to 506 are provided. The ladders 501 to 506 interconnect or incorporate the temperature sensors of twelve dual probe sensors 500 in much the same manner as shown in FIG. 4. As set out below, this arrangement provides a further enhancement in resolution whilst maintaining redundancy and introducing only two additional harnesses or ladders over the arrangement of FIG. 4.

As with the arrangement of FIG. 4, when all of the sensor ladders 501 to 506 and controller channels A and B are functioning normally (the full-up condition), the overlapping and redundancy of this arrangement allows temperature anomalies to be located down to one-sixth of the circumference with a high degree of confidence.

The effects of a temperature hot spot or cold spot around the circumference of the engine may be such that the sensors at one sensor location experience the greatest change in temperature, while the two sensors at sensor locations to either side experience a lesser change.

Based on this assumption, in the embodiment of FIG. 5 it is equally likely that either a hot or cold spot affects the temperature sensors of a single ladder 501 to 503 connected to channel A, or that a hot or cold spot affects two sensor ladders 501 to 503 connected to channel A.

An example of the former scenario is a hot spot at location 2, which results in a large change in the output of temperature sensors at this location, and a lesser change at locations 1 and 3. This results in a large change in the output of sensor ladder 501, and no change in the outputs of sensor ladders 502 and 503. An example of the latter scenario is a hot spot at location 1, resulting in a large change in the output of temperature sensors in this location, and a lesser change at locations 12 and 2. This results in a spread of outputs from sensor ladders 501 to 503, with the output from sensor ladder 501 having the largest change, the output from sensor ladder 502 remaining unchanged, and sensor ladder 503 having an output between that of 501 and 502.

The pattern of sensor ladder outputs received by channel B will correspond to the inverse of those at channel A. If the sensor ladders of channel A are subject to the latter scenario resulting in a spread of outputs from the sensor ladders 501-503, the sensor ladders 504 to 506 of channel B will be subject to the former scenario in which one sensor ladder 504 to 506 has a large change in output and the others remain unchanged.

The above described relationships may thus be used to further enhance the sensing resolution in that it allows identification of a specific location at which a temperature variation has occurred, and to permit verification of the sensing of a fault or anomaly by both channels.

As with the embodiment of FIG. 4, checking of each ladder for a sensor fault by comparison of each ladder output with a corrected average from the overlapping ladders may be undertaken. The combination of checks from all six ladders provides a high degree of confidence in identifying fault conditions in the sensor ladders and associated harnesses. Once a faulty sensor ladder has been identified, the faulty ladder may be eliminated from the calculations of average temperature that are used in engine control law models.

Again, as with the arrangement of FIG. 4, the system can operate in a degraded state in which the failure of a single channel, temperature sensor or sensor ladder can be tolerated without preventing the sensing of faults or anomalies. In the case of a single point failure of a sensor or sensor ladder, this embodiment is still able to detect temperature anomalies around the full circumference and localise them to within one-sixth of the circumference, albeit potentially with reduced confidence since a correlation/verification from the sensor group with the single point failure may not be possible.

In addition to enabling temperature anomalies to be reliably identified and localised to a specific one-sixth of the circumference, this embodiment overcomes all the disadvantages of the arrangement of FIG. 3, including those relating to potential failures of the controller.

In the arrangements described hereinbefore, each ladder interconnects or incorporates either just inner sensors or just outer sensors. However, this need not always be the case and FIGS. 6, 7 and 8 illustrate alternative embodiments in which each sensor ladder interconnects or incorporates both inner and outer temperature sensors.

Figure 6:
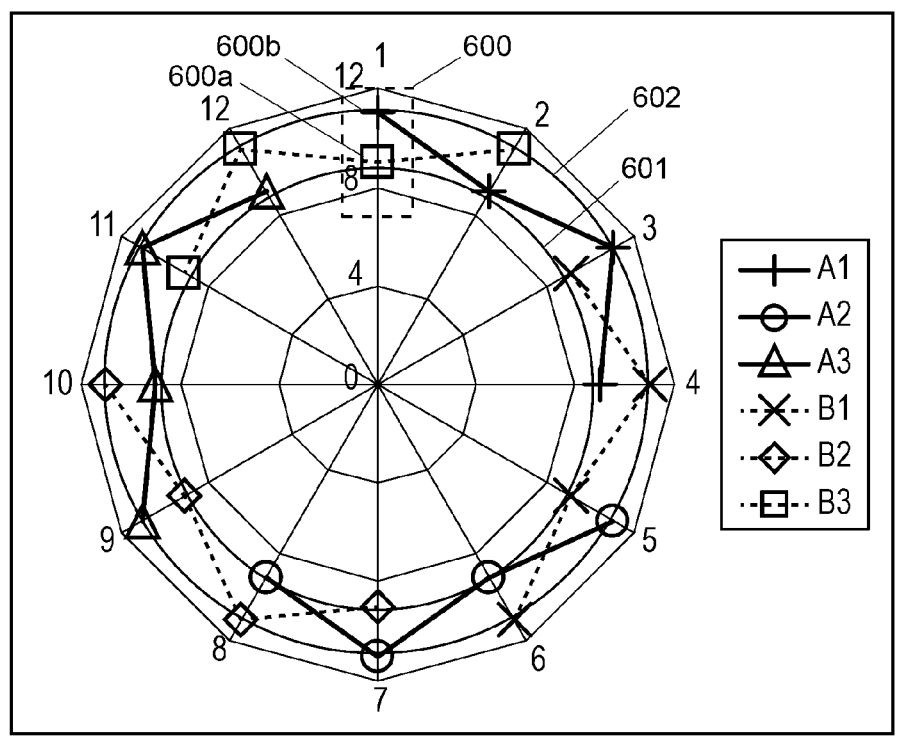
FIG. 6 is a schematic diagram illustrating another alternative embodiment of the invention with six overlapping sensor ladders.
Figure 7:
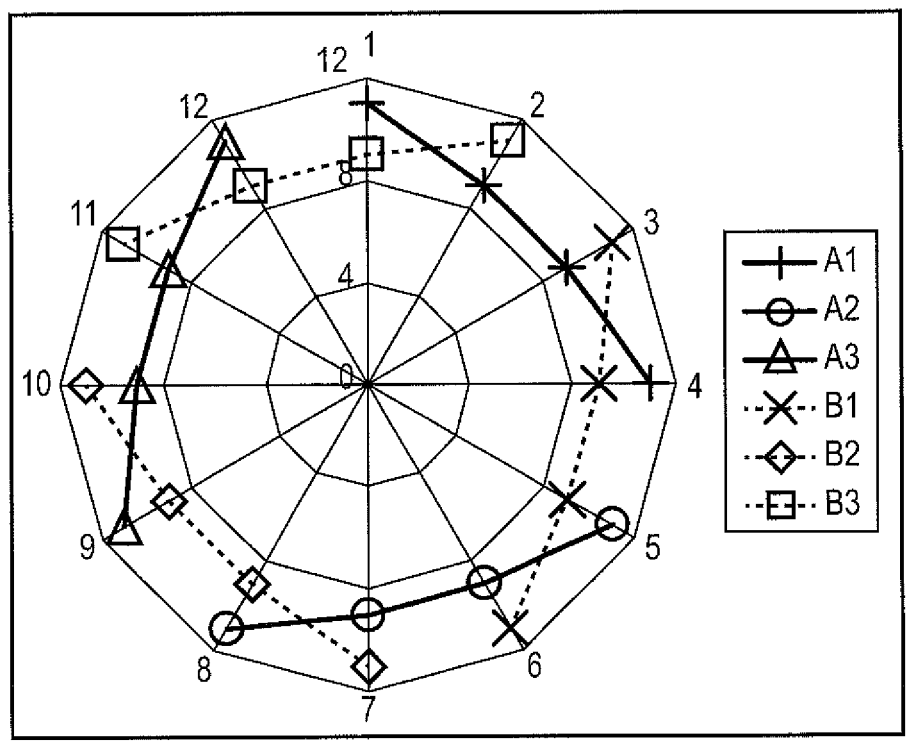
FIG. 7 is a schematic diagram illustrating yet another alternative embodiment of the invention with six overlapping sensor ladders.
Figure 8:
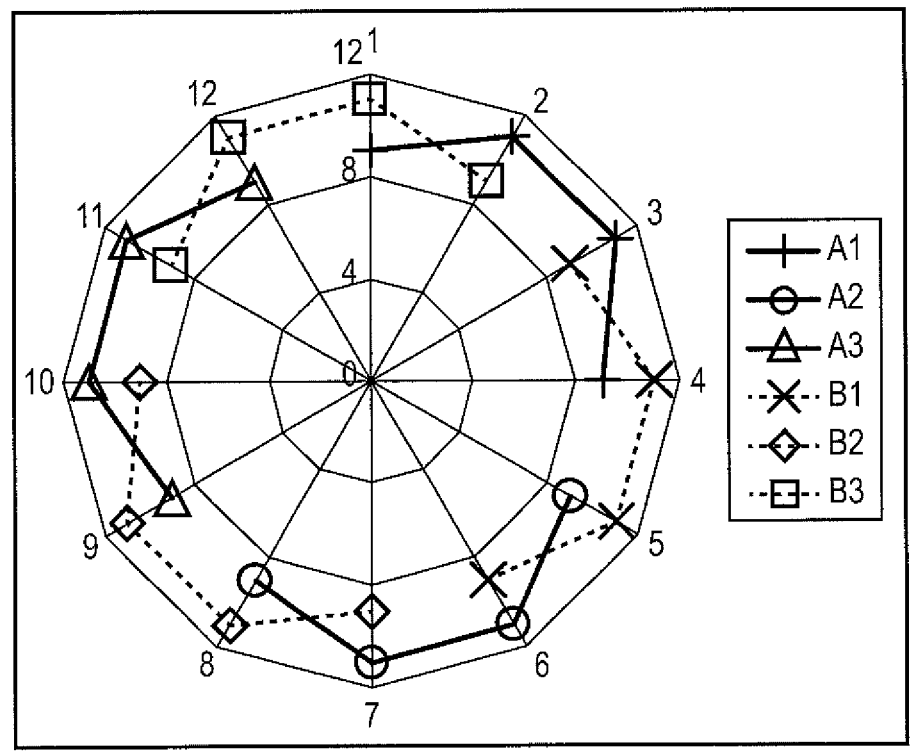
FIG. 8 is a schematic diagram illustrating a further alternative embodiment of the invention with six overlapping sensor ladders.

The arrangements of FIGS. 6, 7 and 8 are similar to the embodiment of FIG. 5, and like features are denoted herein by like reference numerals. In all of these embodiments twelve dual temperature probes 600 are equi-angularly located at sensor locations 1 to 12. Each dual temperature probe 600 has an inner temperature sensor 600a located at an inner circumference 601 and an outer temperature sensor 600b located at an outer circumference 602. In the arrangement of FIG. 6, the inner and outer sensors 600a, 600b are arranged in an alternating fashion along the length of each ladder. As a consequence, alternate ones of the outer sensors 600b are connected to channel A of the controller, the remaining alternate ones of the outer sensors 600b being connected to channel B. Likewise alternate ones of the inner sensors 600a are connected to channel A with the remaining alternate ones of the inner sensors 600a connected to channel B. Each ladder thus includes an equal number of sensors exposed to the fluid temperature on the inner circumference 601 and an equal number of sensors exposed to the temperature at the outer circumference 602. As a consequence, slight temperature differences between the inner and outer circumferences 601, 602 are averaged out.

In the embodiment of FIG. 7, a central part of each ladder contains only inner sensors, the end parts of each ladder incorporating only outer sensors. In FIG. 8, the opposite is true. Accordingly, each ladder comprising four probes receives an average of the fluid path temperature on the inner and outer circumference and the spread of failure effects may be focussed towards the centre of each ladder, allowing temperature sensor faults to be distinguished more easily from the hot or cold spots that occur in the fluid path than is the case with the arrangement of FIG. 6.

The embodiments of FIGS. 5 to 8 show arrangements in which twelve dual temperature probes are provided and arranged in two groups, each group comprising three sensor ladders of four temperature sensors. Each group extends around substantially the full circumference. Although this arrangement is advantageous, it is not essential, and a number of other arrangements may also be considered advantageous from a fault isolation and accommodation perspective, including:

a) 12 dual temperature probes with 3 groups, each group comprising 2 sensor ladders, and each sensor ladder comprising 4 temperature sensors and overlapping two other sensor ladders from a different group by 2 temperature sensors;

b) 16 dual temperature probes with 2 groups, each group comprising 4 sensor ladders, and each sensor ladder comprising 4 temperature sensors and overlapping two other sensor ladders from a different group by 2 temperature sensors;

c) 16 dual temperature probes with 4 groups, each group comprising 2 sensor ladders, and each sensor ladder comprising 4 temperature sensors and overlapping two other sensor ladders from a different group by 2 temperature sensors;

d) 18 dual temperature probes with 2 groups, each group comprising 3 sensor ladders, and each sensor ladder comprising 6 temperature sensors and overlapping two other sensor ladders from a different group by 3 temperature sensors;

e) 18 dual temperature probes with 3 groups, each group comprising 3 sensor ladders, and each sensor ladder comprising 4 temperature sensors and overlapping two other sensor ladders from a different group by 2 temperature sensors;

f) 18 dual temperature probes with 3 groups, each group comprising 2 sensor ladders, and each sensor ladder comprising 6 temperature sensors and overlapping two other sensor ladders from a different group by 3 temperature sensors;

In each of these arrangements, the sensor ladders of each group are connected only to a channel corresponding to that group. In general, when the number of probes is a multiple of at least three prime numbers, advantageous combinations can be configured. Depending on the need for fault enunciation, isolation and accommodation, embodiments with 20, 24 or more temperature sampling locations may be appropriate.

It will be appreciated that although the embodiments described herein use dual temperature probes, this is not an essential feature of the invention, and other arrangements are possible in which the sensor ladders partially overlap.

It will be appreciated that the partial overlap between sensor ladders is an important feature of the invention, achieving redundancy in the spatial sampling and providing improved localisation of temperature anomalies. This partial overlapping approach is superior to an approach employing dual redundant sensor ladders, wherein each sensor ladder has a redundant fully overlapping sensor ladder, since the redundant sensor ladders in this approach do not improve localisation. The improved ability of embodiments of the present invention to localise temperature anomalies in both the 'full-up' condition and a degraded condition enable fewer sensor ladders to be required when compared to an approach employing a dual redundant fully overlapping arrangement, reducing the complexity and weight of the overall sensor system. By comparison, a dual redundant approach with comparable performance would require an excessive number of sensor ladders and associated harnessing.

This can be illustrated by comparison between an arrangement in which four dual redundant quadrant sensor ladders are used, and the embodiment of FIG. 5. The embodiment of the present invention uses only six sensor ladders, and associated harnesses, instead of the eight ladders and associated harnesses required on a dual redundant quadrant arrangement. Also the present invention is capable of localising temperature anomalies to a resolution of one-sixth of the circumference, instead of to a quadrant. Furthermore, the partially overlapping sensor ladders of the present invention provide an enhanced ability to detect temperature anomalies.

The hardest temperature anomaly to detect is one that occurs on the boundary between two sensor ladders. In a dual redundant arrangement the effect of such an anomaly is spread over four sensor ladders. By contrast, in the embodiments of the present invention a temperature anomaly between two sensor ladders is directly in the centre of a third overlapping sensor ladder. The third sensor ladder will therefore sample the entire anomaly, and its temperature will thereby be different to the other sensor ladders, enabling detection of the anomaly.

The logic that uses the sensor ladder readings to detect temperature anomalies and associated faults involves comparisons between sensor ladder signals and the use of thresholds to identify "hot" sensor ladders. More sophisticated cross checks with other sensor ladders may then be used to narrow down the sector of the engine in which a fault has occurred (giving rise to the temperature anomaly). Identifying the sector of the engine in which a fault has occurred eliminates the need to remove components from the entire annulus of the engine to obtain access to the sector in which the fault has occurred, and hence significantly reduces the time required to replace faulty components, for instance a burner or a staging valve.

Figure 9:
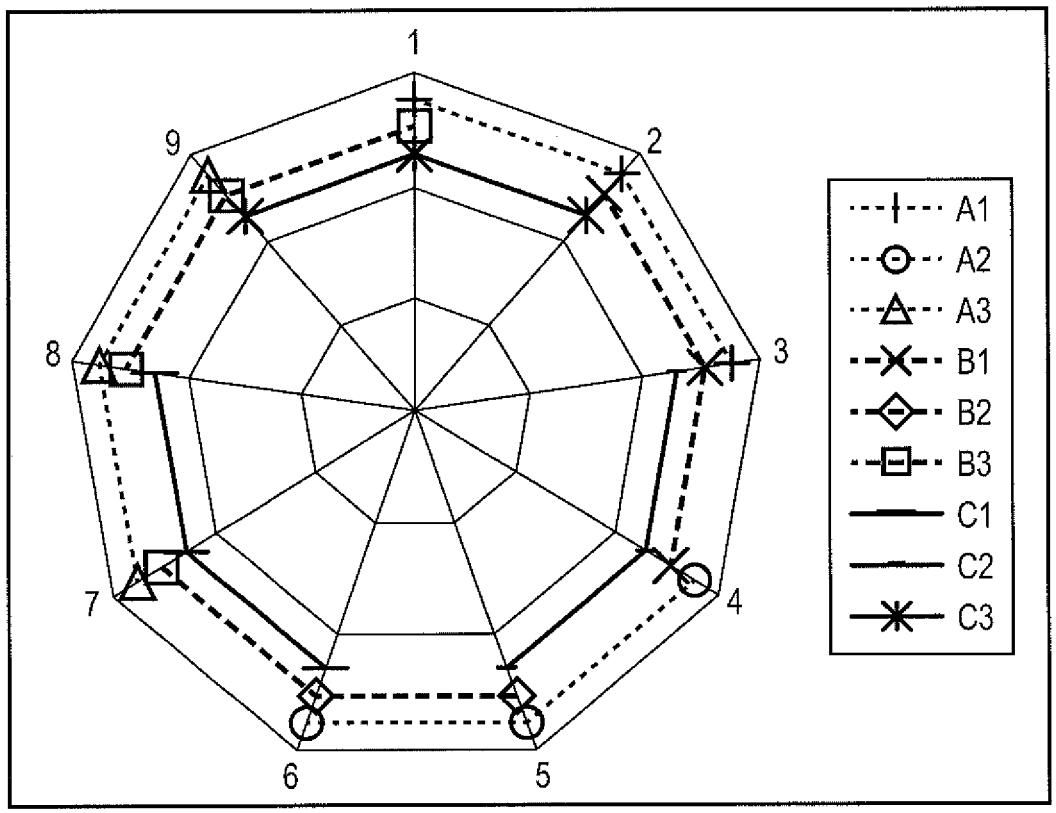
FIGS. 9 and 10 are schematic diagrams of further alternative embodiments incorporating three and four sensors, respectively, at each sensor location.
Figure 10:
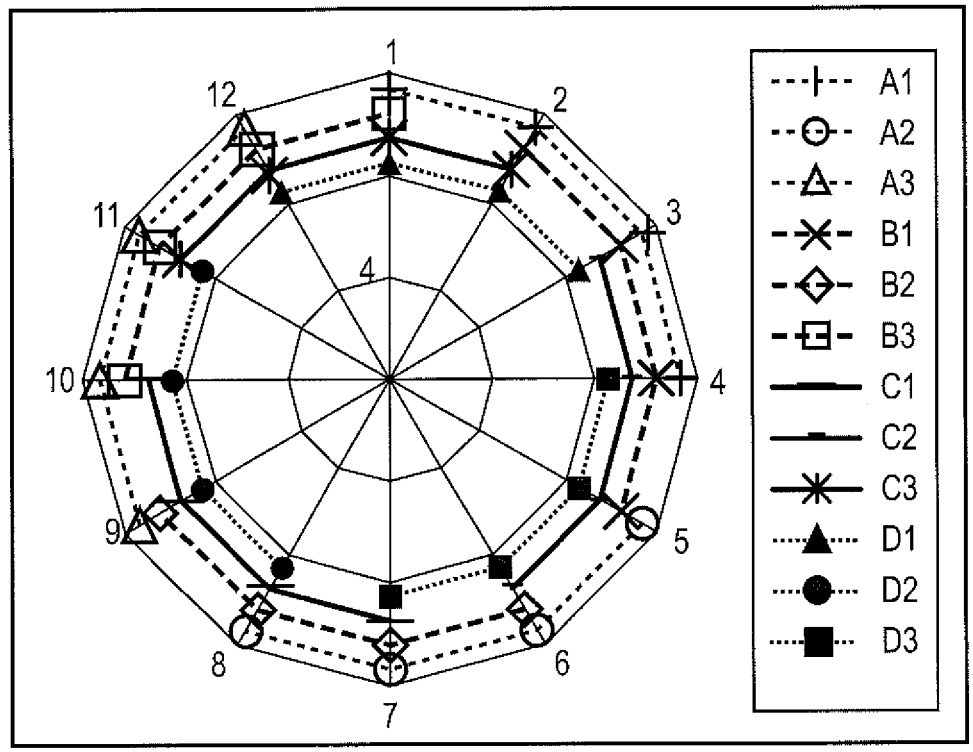

In the arrangements described hereinbefore, just two sensors are associated with each sensor location. However, arrangements are possible in which a greater number of sensors are provided at each radial location (albeit typically axially spaced from one another). By way of example, FIG. 9 illustrates an arrangement in which there are three sensors associated with each radial sensor location, and FIG. 10 illustrates the case where four sensors are provided at each sensor location. The manner in which these arrangements operate is very similar to the methods described hereinbefore and so the operation thereof will not be described in further detail. In each case, as the number of sensors is increased, the number of sensor harnesses is increased. Furthermore, the number of channels in the control unit is also increased. As with the arrangements described hereinbefore, these arrangements allow a significant reduction in the harness requirements of a system with a large number of sensors, whilst maintaining redundancy and allowing enhanced resolution.

In the arrangements described hereinbefore, the sensors of one ladder are radially aligned with some of the sensors of a ladder partially overlapping therewith. It will be understood that this need not always be the case, and that the invention is also applicable to arrangements in which, whilst there is a partial overlap between sensor ladders, the sensors themselves may not be radially aligned with one another.

Figure 11:
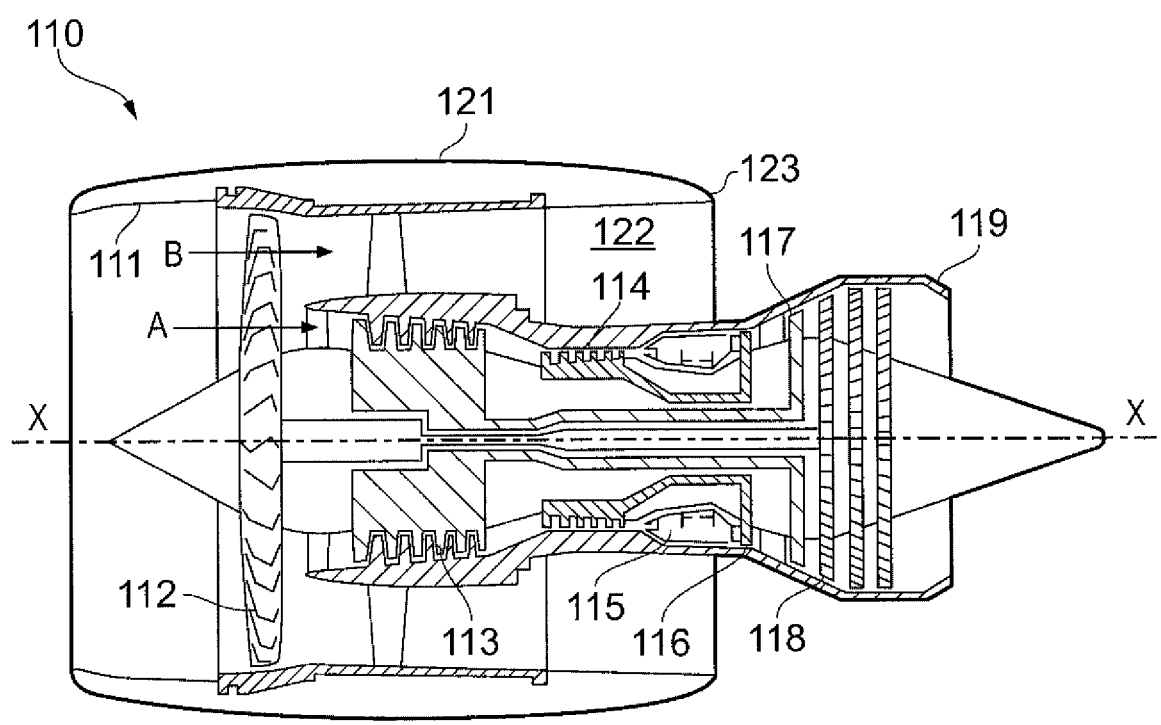
FIG. 11 shows schematically a longitudinal cross-section through a gas-turbine engine.

With reference to FIG. 11, a ducted fan gas turbine engine incorporating a sensor ladder arrangement of the invention is generally indicated at 110 and has a principal and rotational axis X-X. The engine comprises, in axial flow series, an air intake 111, a propulsive fan 112, an intermediate pressure compressor 113, a high-pressure compressor 114, combustion equipment 115, a high-pressure turbine 116, an intermediate pressure turbine 117, a low-pressure turbine 118 and a core engine exhaust nozzle 119. A nacelle 121 generally surrounds the engine 110 and defines the intake 111, a bypass duct 122 and a bypass exhaust nozzle 123.

During operation, air entering the intake 111 is accelerated by the fan 112 to produce two air flows: a first air flow A into the intermediate pressure compressor 113 and a second air flow B which passes through the bypass duct 122 to provide propulsive thrust. The intermediate pressure compressor 113 compresses the air flow A directed into it before delivering that air to the high pressure compressor 114 where further compression takes place.

The compressed air exhausted from the high-pressure compressor 114 is directed into the combustion equipment 115 where it is mixed with fuel and the mixture combusted. The resultant hot combustion products then expand through, and thereby drive the high, intermediate and low-pressure turbines 116, 117, 118 before being exhausted through the nozzle 119 to provide additional propulsive thrust. The high, intermediate and low-pressure turbines respectively drive the high and intermediate pressure compressors 114, 113 and the fan 112 by suitable interconnecting shafts.

The sensor ladder arrangement may be used, for example, to measure the circumferential distribution of temperature in the combustion products in the combustion equipment 115, the high-pressure turbine 116, the intermediate pressure turbine 117, the low-pressure turbine 118 or the core engine exhaust nozzle 119.

A number of other modifications and alterations may be made to the arrangements described herein without departing from the scope of the invention, as defined in the appended claims.

The invention claimed is:

1. An apparatus for measuring the circumferential distribution of temperature in a fluid, comprising
a plurality of sensor ladders, each incorporating a plurality of temperature sensors, wherein
a first one of the sensor ladders partially overlaps a second one of the sensor ladders, part of the first sensor ladder not overlapping the second sensor ladder.

2. An apparatus according to claim 1, further comprising
a plurality of sensor locations, the first sensor ladder incorporating a first plurality of the temperature sensors, each of which is located at a respective one of the sensor locations, and the second sensor ladder incorporating a second plurality of the temperature sensors, each of which is located at a respective one of the sensor locations, wherein
at least one of the first plurality of sensors is located at the same sensor location as at least one of the second plurality of sensors, and at least another one of the first plurality of sensors is located at one of the sensors locations not also accommodating one of the second plurality of sensors.

3. An apparatus according to claim 2, further comprising
a third sensor ladder incorporating a third plurality of temperature sensors, each of which is located at a respective one of the sensor locations, and wherein
at least one of the first plurality of sensors is located at the same sensor location as at least one of the third plurality of sensors, and at least another one of the first plurality of sensors is located at one of the sensors locations not also accommodating one of the third plurality of sensors.

4. An apparatus according to claim 3, wherein
none of the third plurality of sensors shares a sensor location with any of the second plurality of sensors.

5. An apparatus according to claim 1, wherein
each of the sensor ladders is of substantially the same circumferential extent.

6. An apparatus according to claim 1, wherein
temperature sensors associated with at least two sensor ladders are located at each sensor location.

7. An apparatus according to claim 1, wherein
at least two temperature sensors are located at each sensor location.

8. An apparatus according to claim 7, wherein
the at least two temperature sensors comprise an inner sensor and an outer sensor.

9. An apparatus according to claim 8, wherein
at least one of the sensor ladders incorporates only inner sensors and another of the sensor ladders incorporates only outer sensors.

10. An apparatus according to claim 8, wherein
each sensor ladder incorporates at least one inner sensor and at least one outer sensor.

11. An apparatus according to claim 10, wherein the inner and outer sensors are arranged in an alternating fashion along the sensor ladder.

12. An apparatus according to claim 10, wherein a central part of the sensor ladder incorporates only inner sensors and the end parts of the sensor ladder incorporate only outer sensors.

13. An apparatus according to claim 10, wherein a central part of the sensor ladder incorporates only outer sensors and the end parts of the sensor ladder incorporate only inner sensors.

14. An apparatus according to claim 1, wherein three temperature sensors are located at each sensor location.

15. An apparatus according to claim 1, wherein four temperature sensors are provided at each sensor location.

16. An apparatus according to claim 1, further comprising a controller with at least two channels, the first ladder being connected to the first channel of the controller and the second ladder being connected to the second channel of the controller.

17. An apparatus according to claim 16, wherein only one of the sensors located at each location is connected to the first channel, and only a second one of the sensors located at each sensor location is connected to the second channel.

18. A method for identifying the location of an anomaly using an apparatus as claimed in claim 1, the method comprising the steps of:

comparing the output of one sensor ladder with the outputs of other sensor ladders with which the said one sensor ladder does not overlap to identify the ladder with which the anomaly is associated, and comparing the outputs of the sensor ladders with which the said identified sensor ladder partially overlaps to identify the sensor location with which the anomaly is associated.

19. A gas turbine engine equipped with an apparatus as claimed in claim 1.

* * * * *